(12) United States Patent
Ghiotti et al.

(10) Patent No.: US 11,491,733 B2
(45) Date of Patent: Nov. 8, 2022

(54) METHOD AND DEVICE FOR THE ULTRASONIC WELDING OF PLASTIC COMPONENTS OF AN ELECTRONIC CIGARETTE OR OF AN ELECTRONIC CIGARETTE CARTRIDGE

(71) Applicant: G.D SOCIETA' PER AZIONI, Bologna (IT)

(72) Inventors: Roberto Claudio Franco Ghiotti, Monte S. Pietro (IT); Luca Federici, Bologna (IT)

(73) Assignee: G.D SOCIETA' PER AZIONI, Bologna (IT)

(*) Notice: Subject to any disclaimer, the term of this patent is extended or adjusted under 35 U.S.C. 154(b) by 605 days.

(21) Appl. No.: 16/332,552

(22) PCT Filed: Sep. 21, 2017

(86) PCT No.: PCT/IB2017/055738
§ 371 (c)(1),
(2) Date: Mar. 12, 2019

(87) PCT Pub. No.: WO2018/055552
PCT Pub. Date: Mar. 29, 2018

(65) Prior Publication Data
US 2021/0276273 A1   Sep. 9, 2021

(30) Foreign Application Priority Data
Sep. 21, 2016   (IT) .................. 102016000094855

(51) Int. Cl.
*B29C 65/08*   (2006.01)
*B29C 65/00*   (2006.01)
*B29L 31/00*   (2006.01)

(52) U.S. Cl.
CPC ........ *B29C 65/08* (2013.01); *B29C 66/81463* (2013.01); *B29C 66/8242* (2013.01);
(Continued)

(58) Field of Classification Search
CPC .............. B29C 65/08; B29C 66/81463; B29C 66/8242; B29C 66/8322; B29C 66/8432;
(Continued)

(56) References Cited

U.S. PATENT DOCUMENTS 6,413,334 B1 * 7/2002 Rittner ................ B29C 66/8322
156/64
8,925,607 B2   1/2015 Yamamoto
(Continued)

FOREIGN PATENT DOCUMENTS

CN   102470604 A   5/2012
CN   103416853 A   12/2013
(Continued)

OTHER PUBLICATIONS

Translation of CN103416853 A, Lin Guangrong, Aug. 10, 2016 (Year: 2016).*
(Continued)

*Primary Examiner* — George R Koch
(74) *Attorney, Agent, or Firm* — Marshall, Gerstein & Borun LLP

(57) ABSTRACT

A method and a device for the ultrasonic welding of a first component to a second component of an electronic cigarette cartridge, wherein both components are made of a plastic material; the device includes an ultrasound generator, which delivers an electric pulse to a vibrating assembly, which, in turn, includes a converter designed to turn the electric pulse into a mechanical vibration movement and transfers it to a sonotrode, which directly transmits the energy in the form of vibrations to the two components to be welded; the sono-
(Continued)

trode is designed so as to simultaneously weld a plurality of first components to the respective second components and cooperates with a plurality of striker elements, each associated to a respective first component and to a respective second component to be welded; and wherein each striker element is connected to a sensor, which is designed to detect a parameter of the welding process carried out to weld the first component to the second component and to control the welding process carried out to weld the first component to the second component based on the parameter.

13 Claims, 1 Drawing Sheet

(52) U.S. Cl.
CPC ...... *B29C 66/8322* (2013.01); *B29C 66/8432* (2013.01); *B29C 66/872* (2013.01); *B29C 66/9231* (2013.01); *B29C 66/961* (2013.01); *B29L 2031/7416* (2013.01)

(58) Field of Classification Search
CPC ............. B29C 66/872; B29C 66/9231; B29C 66/961; B29L 2031/7416
See application file for complete search history.

(56) References Cited

U.S. PATENT DOCUMENTS

| | | |
|---|---|---|
| 2007/0251643 A1 | 11/2007 | Umebayashi et al. |
| 2009/0061151 A1 | 3/2009 | LaFond et al. |
| 2009/0250171 A1 | 10/2009 | Wieduwilt et al. |

FOREIGN PATENT DOCUMENTS

| | | | | |
|---|---|---|---|---|
| EP | 2077938 A1 | | 7/2009 | |
| EP | 2818304 A1 | | 12/2014 | |
| JP | 2000335539 A | | 12/2000 | |
| JP | 2004209659 A | * | 7/2004 | ............ B29C 65/08 |
| WO | WO-2005/105410 A1 | | 11/2005 | |
| WO | WO-2008/043615 A1 | | 4/2008 | |
| WO | WO-2011/013816 A1 | | 2/2011 | |

OTHER PUBLICATIONS

Translation of JP 2004209659 A, published Jul. 2004, first named inventor Arai (Year: 2004).*
International Application No. PCT/IB2017/055738, Written Opinion of the International Searching Authority, dated Jan. 18, 2018.
International Preliminary Report on Patentability, corresponding International Application No. PCT/IB2017/055738, dated Mar. 26, 2019.
Office Action, Chinese patent application No. 201780057162.0, dated Aug. 10, 2020.
International Application No. PCT/IB2017/055738, International Search Report, dated Jan. 18, 2018.

* cited by examiner

METHOD AND DEVICE FOR THE ULTRASONIC WELDING OF PLASTIC COMPONENTS OF AN ELECTRONIC CIGARETTE OR OF AN ELECTRONIC CIGARETTE CARTRIDGE

CROSS-REFERENCE TO RELATED APPLICATIONS

This is U.S. national phase of International Application No. PCT/IB2017/055738, filed Sep. 21, 2017, which claims the benefit of Italian Patent Application No. 102016000094855, filed Sep. 21, 2016.

TECHNICAL FIELD

The present invention relates to a method and a device for the ultrasonic welding of plastic components of an electronic cigarette or of an electronic cigarette cartridge.

PRIOR ART

Recently, disposable (i.e. for single use) cartridges for electronic cigarettes have been proposed, which comprise a casing made of a tubular-shaped plastic material with a micro-perforated bottom wall, the inside of which contains a certain amount of tobacco powder topped by a piece of filtering material; and closed at an upper end with a sealing ring.

The production of such cartridges involves filling the casings with a calibrated amount of tobacco powder, slightly compressing the mass of tobacco powder inside each casing to achieve the desired density, and then sealing the cartridges by applying both the piece of filtering material and the sealing ring to the upper open end. The cartridges are then individually weighed in order to allow the non-conforming ones containing, on the inside, an insufficient or excessive amount of tobacco powder to be discarded.

Once the production of the cartridges is completed, the latter are inserted in packages, typically blister packages, which comprise an electronic cigarette and a plurality of said disposable cartridges.

Currently, the production of both the blister packages and the cartridges contained within these packages is mostly performed manually or with rudimentary packing machines involving constant labour force; consequently, the production of cartridges and blister packs is slow (i.e. with low productivity) and with a highly variable (but generally poor) quality.

In order to overcome these drawbacks, automatic machines for the packaging of disposable cartridges have been proposed, which comprise a conveyor that receives an orderly mass of empty casings and along which a station for filling the empty casings with tobacco powder, a station for feeding the pieces of filtering material and a station for feeding the sealing rings and, subsequently, a station for welding said sealing rings onto the casings are arranged in succession. Typically, the welding station performs an ultrasonic welding and comprises a plurality of sonotrodes (e.g. fifteen sonotrodes), each cooperating with a respective support (or anvil) in order to be able to simultaneously weld a plurality of disposable cartridges, but with considerable increase in costs and overall dimensions.

In order to solve this drawback, ultrasonic welding devices have been proposed in which a single generator can simultaneously weld a plurality of first components to a plurality of respective second components. For example, a device for the ultrasonic welding of a first component to a second component of an electronic cigarette, wherein both components are made of a plastic material, is described in document CN103416853. However, these devices have the drawback of not being able to control the individual welding processes and of generating welds that vary considerably from one another.

DESCRIPTION OF THE INVENTION

One object of the present invention is to provide a device for the ultrasonic welding of plastic components of an electronic cigarette or of an electronic cigarette cartridge, which device ensures high productivity, guaranteeing high quality standards and, at the same time, is cheap and easy to produce.

A further object of the present invention is to provide a method for the ultrasonic welding of plastic components of an electronic cigarette or of an electronic cigarette cartridge, which method is free from the drawbacks of the state of the art and, at the same time, is cheap and easy to produce.

In accordance with the present invention, a method and a device for the ultrasonic welding of plastic components of an electronic cigarette are provided as claimed in the appended claims.

BRIEF DESCRIPTION OF THE DRAWINGS

The present invention will now be described with reference to the accompanying drawings, which illustrate a non-limiting embodiment thereof, in which.

PREFERRED EMBODIMENTS OF THE INVENTION

Figures 1, 2:
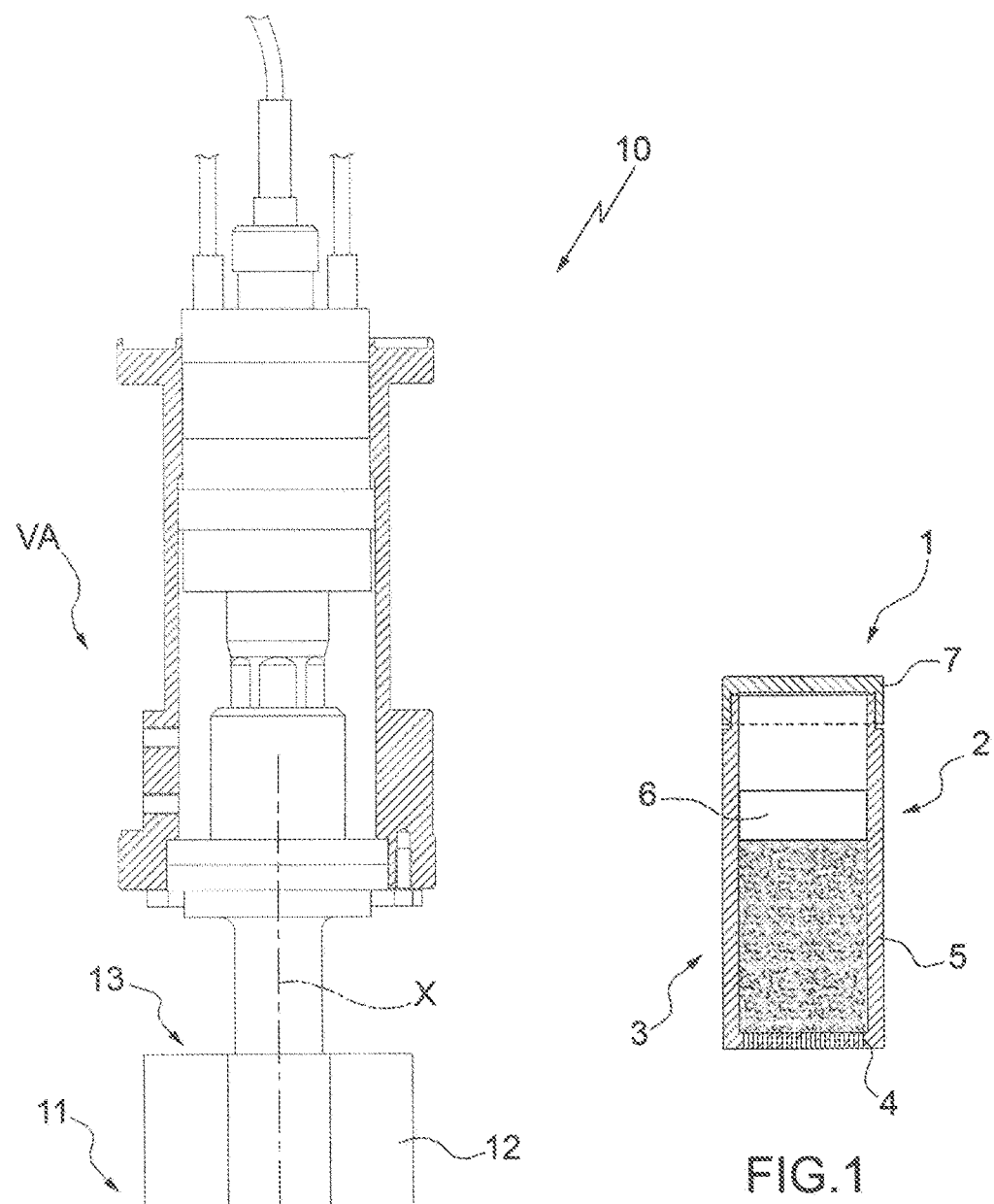
FIG. 1 is a sectional view of a disposable cartridge for electronic cigarettes.
FIG. 2 is a schematic view of a device for the ultrasonic welding of plastic components provided in accordance with the present invention.

In FIG. 1, numeral 1 indicates, as a whole, a disposable cartridge, comprising a casing 2 made of a plastic material and formed as a tubular containment body 3 having a micro-perforated bottom wall 4 and a substantially cylindrical side wall 5; the inside of the casing 2 contains a certain amount of tobacco powder topped by a piece of filtering material 6; a sealing ring 7 also made of a plastic material is coupled to an upper end of the casing 2.

In FIG. 2, numeral 10 indicates, as a whole, a device for welding the sealing rings 7 to the casings 2. The welding device 10 performs an ultrasonic welding.

The welding device 10 comprises a single ultrasound generator, which delivers a high-frequency sinusoidal electrical pulse to a vibrating assembly VA, which, in turn, comprises a converter designed to turn the electric pulse into a mechanical vibration movement, a booster, which amplifies the mechanical vibration movement and transfers it to a sonotrode 11, which directly transmits the energy in the form of vibrations to the casing 2 and the sealing ring 7 to be secured to one another and applies a welding pressure P.

As shown in FIG. 2, the sonotrode 11 comprises a body 12, which extends longitudinally along an axis X. The body 12 comprises one end 13 that can be connected to the single ultrasound generator, and one end 14, opposite the first end 13, defining an opening in communication with the outside of the sonotrode 11.

The end 14 is designed to at least partially receive, on the inside, a plurality of sealing rings 7 to be welded.

In particular, at its end 14, the sonotrode 11 has a profile designed to at least partially come into contact with a plurality $n_1$ of sealing rings 7 to be simultaneously welded (in particular, seven or eight sealing rings 7 to be welded).

The sonotrode 11 cooperates with a respective anvil 15 (or support) for raising the disposable cartridges 1 towards the welding head of said sonotrode 11.

A support member 16 for supporting a plurality of disposable cartridges 1 is interposed between the sonotrode 11 and the anvil 15; the support member 16 is provided with a plurality of seats 17, each of which is in turn provided with jaws, which retain a respective disposable cartridge 1 during transport and release it to allow welding. The anvil 15, in turn, comprises a support body 18 internally housing a plurality of pneumatic or electrical pistons 19 (of the known type and not described in detail). Each piston 19 is movable along the substantially longitudinal direction H (and parallel to the axis X) between an upper extreme position and a rest position; and vice versa. A raised operating position (shown in FIG. 2) is further provided, in which each piston 19 supports a respective disposable cartridge 1 so that the sealing ring 7 is at least partially in contact with the sonotrode 11 in order to achieve a welding that is intermediate between the upper extreme position and a rest position.

Lastly, each piston 19 is connected to a respective sensor 20. According to a preferred variant, the sensor 20 is a linear encoder. The sensor 20 is designed to read the linear movement of the piston 19 along the direction H.

Importantly, the sonotrode 11 is designed to simultaneously weld a plurality $n_1$ of sealing rings 7 to the respective casings 2, whose number $n_1$ is equal to the number $n_1$ of pistons 19 of the anvil 15. In other words, for each disposable cartridge 1 to be subjected to welding, a respective piston 19 is provided.

In use, the support member 16 transfers the plurality $n_1$ of disposable cartridges 1 containing the certain amount of tobacco powder topped by a piece of filtering material 6 and fitted with the sealing ring 7 to be welded in the area of the device 10 for the ultrasonic welding, so that each disposable cartridge 1 (i.e. each seat 17 of the support member 16 that conveys the disposable cartridges 1) is arranged in a position facing, and exactly in the area of, a respective piston 19 and the end 14 of the sonotrode 11. The jaws of the seats 17 release the disposable cartridges 1, and the welding is carried out through the raising of the disposable cartridge 1 performed by the respective piston.

In particular, the following steps occur in succession:
- the support member 16 carries the casings 2 containing the certain amount of tobacco powder topped by a piece of filtering material 6 and fitted with the sealing ring 7 to be welded below the sonotrode 11;
- each piston 19 places itself in the rest position along the direction H in which it is located below a respective casing 2;
- the jaws of the seats 17 release the respective casings 2, each of which is supported by a respective piston 19;
- the piston 19 is operated again so that it moves to the raised operating position, in which the sealing ring 7 abuts against the end 14 of the sonotrode 11;
- each sensor 20 detects the linear movement $X_0$ made by the respective piston 19 so that it reaches the raised operating position, i.e. to place the sealing ring 7 in abutment against the end 14 of the sonotrode 11;
- the vibrating assembly VA is turned on so that the mechanical vibration movement generates a heat that allows the plastic materials of the casing 2 and of the sealing ring 7 to melt at the desired positions;
- the piston 19 continues to move upward from the raised operating position along the direction H, and each sensor 20 continues to detect the linear movement $X_1$ made by the respective piston 19 from the raised operating position;
- when the sensor 20 detects that the linear movement $X_1$ made by the respective piston 19 from the raised operating position is equal to a reference value $X_{ref}$, the upward movement along the direction H of the piston 19 is stopped.

The reference value $X_{ref}$ is determined in a step for setting up the ultrasonic welding device 10, and so as to ensure that the casing 2 has been welded to the sealing ring 7 of each disposable cartridge 1.

Once the upward movement of all the pistons 19 of the anvil 15 along the direction H has been stopped, the vibrating assembly VA is turned off.

At this point, the pistons 19 are again operated upwards along the direction H from the raised operating position, in which the sealing ring 7 abuts against the end 14 of the sonotrode 11, so as to allow the joining area between the casing 2 and the sealing ring 7 of each disposable cartridge 1 to cool down. The step of cooling the joining area between the casing 2 and the sealing ring 7 of each disposable cartridge 1 has a duration $t_1$, which is determined in a step for setting up the ultrasonic welding device 10, and so as to ensure that the casing 2 is joined to the sealing ring 7 of each disposable cartridge 1 in a compact manner.

Once the cooling step is completed, the pistons move downwards, again along the direction H, from the raised operating position to the rest position, in which the disposable cartridges 1 are transferred again into a respective seat 17 where they are retained by the jaws of the respective seat.

According to a first variant, when the sensor 20 detects that the linear movement $X_1$ made by the respective piston 19 from the raised operating position is equal to a reference value $X_{ref}$ and the upward movement along the direction H of the piston 19 is stopped, the piston 19 places itself in the raised operating position, in which the sealing ring 7 still abuts against the end 14 of the sonotrode 11.

According to a further variant, when the sensor 20 detects that the linear movement $X_1$ made by the respective piston 19 from the raised operating position is equal to a reference value $X_{ref}$ and the upward movement along the direction H of the piston 19 is stopped, said piston 19 moves downward along the direction H so that the sealing ring 7 faces, but from a distance, the end 14 of the sonotrode 11.

It will also be apparent that the piston 19 can advantageously be replaced by a spring device; and the sensor 20 can advantageously be of the piezoelectric type to detect a reduction in current.

Clearly, the ultrasonic welding device 10 described above can be used to weld other electronic cigarette plastic components to each other.

The ultrasonic welding device 10 described above has numerous advantages.

In the first place, the ultrasonic welding device 10 described above allows high hourly productivity to be achieved, while ensuring high quality standards through the use of a single sonotrode 11 manufactured so as to simultaneously weld a plurality $n_1$ of sealing rings 7 to the respective casings 2. In addition, the use of the sensors 20 allows for taking into account the differences between the various pistons 19.

The invention claimed is:

1. A device (10) for the ultrasonic welding of a first component (2) to a second component (7) of an electronic cigarette or of an electronic cigarette cartridge (1), wherein both components (2, 7) are made of a plastic material; the device comprising:
an ultrasound generator, which delivers an electric pulse to a vibrating assembly (VA), which, in turn, comprises a converter designed to turn the electric pulse into a mechanical vibration movement and transfers it to a sonotrode, which directly transmits energy in the form of vibrations to the two components (2, 7) to be welded;
the sonotrode (11) is designed so as to simultaneously weld a plurality ($n_1$) of the first components (2) to a plurality ($n_1$) of the respective second components (7) and cooperates with a plurality of striker elements (19), each associated with a respective first component (2) and a respective second component (7) to be welded, each striker element being individually movable to bring the respective first component and the respective second component into a welding position; and
a plurality of sensors, each striker element (19) is connected to a respective one of the plurality of sensors (20), each sensor is designed to detect a parameter ($X_1$) of the welding process carried out to weld the respective first component (2) to the respective second component (7) to which the striker element connected thereto is associated and individually control movement of the striker element to which it is connected to control the welding process carried out to weld the respective first component (2) to the respective second component (7) as a function of the parameter ($X_1$) by stopping the movement of the striker element to which it is connected when the parameter ($X_1$) equals a reference parameter ($X_{ref}$).

2. The device according to claim 1, wherein the sonotrode (11) comprises a body (12), which extends longitudinally along an axis (X) and comprises a first end (13), which is connected to the ultrasound generator, as well as a second end (14), opposite the first end (13), which is designed to at least partially receive, on an inside, the plurality ($n_1$) of the second components (7) to be simultaneously welded to the respective first components (2).

3. The device according to claim 1, wherein each sensor of the plurality of sensors (20) is designed to detect a linear movement of the striker element (19) along a longitudinal direction (H).

4. The device according to claim 1, wherein each striker element (19) is movable along a longitudinal direction (H) between an upper extreme position and a rest position, and vice versa; and wherein a raised operating position is provided between the upper extreme position and the rest position, in which each striker element (19) causes the second component (7) to be welded to at least partially come into contact with the sonotrode (11).

5. The device according to claim 1, wherein each striker element (19) is a pneumatically or electrically operated piston.

6. A method for the ultrasonic welding of a first component (2) to a second component (7) of an electronic cigarette or of an electronic cigarette cartridge (1), wherein both components (2, 7) are made of a plastic material; said method being carried out by a welding device (10) according to claim 1; the method comprises the steps of:

simultaneously placing the plurality of first components (2) and the plurality of second components (7) to be welded in the area of the respective striker elements (19);
moving each striker element (19) along a longitudinal direction (H), so that it is in a raised operating position, in which the second component (7) to be welded is at least partially in contact with the sonotrode (11);
controlling turning on of the vibrating assembly (VA), so that the mechanical vibration movement generates a heat that allows each second component (7) to be welded to the respective first component (2);
detecting, by the plurality of sensors (20), the parameter ($X_1$) of the welding process carried out to weld the respective first component (2) to the respective second component (7); and
stopping the movement of the striker element (19) when the parameter ($X_1$) of the welding process carried out to weld the respective first component (2) to the respective second component (7) is equal to the reference value ($X_{ref}$).

7. The method according to claim 6, wherein the reference value ($X_{ref}$) is determined in a set up phase and so as to ensure that each second component (7) has been welded to the respective first component (2).

8. The method according to claim 6, wherein, after having detected that the parameter ($X_1$) of the welding process carried out to weld the first component (2) to the second component (7) is equal to the reference value ($X_{ref}$), the striker element (19) moves to the raised operating position, in which the second component (7) to be welded is at least partially in contact with the sonotrode (11).

9. The method according to claim 6, wherein, after having detected that the parameter ($X_1$) of the welding process carried out to weld the first component (2) to the second component (7) is equal to the reference value ($X_{ref}$), the striker element (19) moves along the longitudinal direction (H) in such a way that the second component (7) faces, but from a distance, the sonotrode (11).

10. The method according to claim 6 and comprising the further step of ordering turning off of the vibrating assembly (VA) when the movement of all striker elements (19) has been stopped.

11. The method according to claim 10 and comprising the further steps of moving each striker element (19) along the longitudinal direction (H) so that it reaches the raised operating position, in which the second component (7) is at least partially in contact with the sonotrode (11), so as to allow the joining area between the first component (2) and the second component (7) to cool down.

12. The method according to claim 6, wherein the parameter ($X_1$) of the welding process carried out to weld the first component (2) to the second component (7) is a linear movement ($X_1$) made by the respective striker element (19) relative to the raised operating position.

13. A device (10) for the ultrasonic welding of a first component (2) to a second component (7) of an electronic cigarette or of an electronic cigarette cartridge (1), wherein both components (2, 7) are made of a plastic material; the device comprising:
an ultrasound generator, which delivers an electric pulse to a vibrating assembly (VA);
the vibrating assembly (VA) comprising a converter designed to turn the electric pulse into a mechanical vibration movement and transfer it to a sonotrode, which directly transmits energy in the form of vibrations to the two components (2, 7) to be welded;

the sonotrode (11) designed so as to simultaneously weld a plurality ($n_1$) of the first components (2) to a plurality ($n_1$) of the respective second components (7) and cooperates with a plurality of striker elements (19); each striker element of the plurality of striker elements is associated with a respective first component (2) and a respective second component (7) to be welded and each striker element independently moves along a longitudinal direction between an upper extreme position and a rest position, and a raised operating position of each striker element is provided between the upper extreme position and the rest position such that in operation each striker element in the raised operating position supports the respective first component and the respective second component to be welded such that the respective second component is at least partially in contact with the sonotrode; and a plurality of sensors, each striker element (19) is connected to a respective one of the plurality of sensors (20), each sensor is designed to detect movement of the striker element to which it is connected and to control the welding process carried out to weld the respective first component (2) to the respective second component (7) as a function of the movement of the striker element such that the vibrating assembly is turned on when each sensor detects each respective striker element to which it is connected is in the raised operating position, each striker element is then individually moved from the raised operating position towards the upper extreme position, each striker element is individually stopped when the respective sensor connected thereto detects the movement of the striker element from the raised operating position is equal to a reference value ($X_{ref}$), and the vibrating assembly is turned off when the movement of each striker element has been stopped.

\* \* \* \* \*